United States Patent
Tsukagoshi et al.

(10) Patent No.: US 8,502,882 B2
(45) Date of Patent: Aug. 6, 2013

(54) IMAGE PICK-UP APPARATUS, WHITE BALANCE SETTING METHOD AND RECORDING MEDIUM

(75) Inventors: Takeshi Tsukagoshi, Ome (JP); Noriyasu Murata, Tachikawa (JP); Hiroyasu Kitagawa, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 318 days.

(21) Appl. No.: 12/917,632

(22) Filed: Nov. 2, 2010

(65) Prior Publication Data

US 2011/0102632 A1    May 5, 2011

(30) Foreign Application Priority Data

Nov. 4, 2009    (JP) .................................. 2009-252555

(51) Int. Cl.
| | |
|---|---|
| H04N 9/73 | (2006.01) |
| H04N 5/235 | (2006.01) |
| H04N 5/228 | (2006.01) |
| H04N 5/222 | (2006.01) |
| G06K 9/00 | (2006.01) |
| G06K 9/40 | (2006.01) |

(52) U.S. Cl.
USPC .................. 348/223.1; 348/222.1; 348/225.1; 348/333.01; 348/333.12; 382/167; 382/274

(58) Field of Classification Search
USPC .................... 348/207.99, 207.1, 222.1–225.1, 348/229.1, 333.01–333.12; 382/162–173, 382/274–275
See application file for complete search history.

(56) References Cited

U.S. PATENT DOCUMENTS

| | | | |
|---|---|---|---|
| 6,965,401 | B1 | 11/2005 | Takei |
| 7,307,656 | B2 | 12/2007 | Takei |
| 7,974,469 | B2 * | 7/2011 | Kurumisawa et al. ........ 382/167 |
| 2004/0189818 | A1 * | 9/2004 | Tsuruoka et al. .......... 348/221.1 |
| 2006/0001748 | A1 * | 1/2006 | Kamon et al. ................ 348/234 |
| 2006/0284991 | A1 * | 12/2006 | Ikeda ......................... 348/223.1 |

(Continued)

FOREIGN PATENT DOCUMENTS

| | | |
|---|---|---|
| JP | 11-289548 A | 10/1999 |
| JP | 2000-350232 A | 12/2000 |

(Continued)

OTHER PUBLICATIONS

Japanese Office Action dated Oct. 25, 2011 (and English translation thereof) in counterpart Japanese Application No. 2009-252555.

*Primary Examiner* — Michael Osinski
(74) *Attorney, Agent, or Firm* — Holtz, Holtz, Goodman & Chick, P.C.

(57) ABSTRACT

In an image pick-up apparatus 1, when an instruction of setting white balance is given by user's manual operation, a central region of a picked up image is set and further the central region of image is divided into plural regions of image. In each of the plural regions of image, RGB components are detected, and gain values of R and B components are calculated, which make these R and B components equivalent to G component. Further, when a variance of colors of the plural regions of image is less than a predetermined threshold value, it is determined that a picture is taken with a color pattern set at the center of viewing angle, an average of gain values set for the plural regions of image is calculated and the average is supplied to a gain controlling unit 41 to be applied to an image signal.

10 Claims, 3 Drawing Sheets

U.S. PATENT DOCUMENTS

| | | |
|---|---|---|
| 2007/0047019 A1 | 3/2007 | Toyoda |
| 2007/0146498 A1* | 6/2007 | Kim et al. .................. 348/223.1 |
| 2007/0252903 A1* | 11/2007 | Tsuda ...................... 348/231.99 |
| 2008/0266417 A1* | 10/2008 | Abe .......................... 348/223.1 |
| 2009/0066806 A1* | 3/2009 | Hayaishi .................... 348/223.1 |
| 2009/0141976 A1* | 6/2009 | Tsukada ...................... 382/167 |
| 2009/0167957 A1* | 7/2009 | Joo et al. ...................... 348/687 |
| 2011/0090362 A1* | 4/2011 | Yanagita et al. ........... 348/222.1 |
| 2011/0115898 A1* | 5/2011 | Hikosaka ........................ 348/81 |
| 2012/0008008 A1* | 1/2012 | Nakabayashi et al. ..... 348/223.1 |

FOREIGN PATENT DOCUMENTS

| | | |
|---|---|---|
| JP | 2001-169307 A | 6/2001 |
| JP | 2002-271810 A | 9/2002 |
| JP | 2003-244723 A | 8/2003 |
| JP | 2007-067815 A | 3/2007 |

* cited by examiner

IMAGE PICK-UP APPARATUS, WHITE BALANCE SETTING METHOD AND RECORDING MEDIUM

BACKGROUND OF THE INVENTION

1. Field of the Invention

The present invention relates to an image pick-up apparatus, a white balance setting method and a recording medium.

2. Description of the Invention

In general, color of pictures shot with a digital camera changes or is affected by a light source and/or shooting conditions. To solve the inconvenience, conventional digital cameras have a function that adjusts a gain (hereinafter, referred to as "gain value") of each of RGB components contained an image output from an image pick-up device, providing pictures of more natural color. The function sets appropriate white balance of images shot with the digital cameras.

There have been proposed various methods of setting white balance of images. One of well known methods is that a user selects an object (color pattern) to be used as a reference of a white-gray level, and takes a picture with the object (reference) set at a center of the whole viewing angle or takes a picture with the object set over the whole viewing angle, manually setting white balance of images.

Another simple method of setting appropriate white balance of images is proposed for beginner users.

For instance, Japanese Patent No. 2003-244723 A discloses a digital camera, which divides a shot image into plural areas, and judges if a white area is included in these divided areas or not, and, if a white area is found, sets white balance based on such white area.

DISCLOSURE OF THE INVENTION

Problems to be Solved by the Invention

As described above, there are proposed the white balance setting method for the users familiar with digital cameras and the white balance setting method for the beginner users of the digital camera. But there is a problem that no method of setting white balance has been proposed, which can be used simply and conveniently by any user.

SUMMARY OF THE INVENTION

The present invention has been made in consideration of the problems involved in the conventional technique. The present invention has an object to provide an apparatus and method for setting an appropriate balance, which can be conveniently used by any user from a beginner to an expert.

According to one aspect of the invention, there is provided an image pick-up apparatus, which comprises image pick-up means having an image pick-up range for picking up an image dividing means for dividing a central area of the image picked up by the image pick-up means into a predetermined number of regions of image, wherein the image corresponds to the image pick-up range of the image pick-up means, judging means for judging based on a variance of colors of the predetermined number of regions of image divided by the dividing means, whether or not an object image exists in the vicinity of a center of the image picked up by the image pick-up means, wherein the object image is used as a reference to adjust white balance, and first setting means for adjusting gain values of color components included in each of the predetermined number of regions of image, thereby setting white balance of the image corresponding to the image pick-up range of the image pick-up means, when the judging means determines that the object image exists in the vicinity of the center of the image picked up by the image pick-up means.

According to another aspect of the invention, there is provided a method of setting white balance of an image picked up by an image pick-up device, wherein the image pick-up device has an image pick-up range, which method comprises the steps of dividing step of dividing a central area of the image picked up by the image pick-up device into a predetermined number of regions of image, wherein the image corresponds to the image pick-up range of the image pick-up device, judging step of judging based on a variance of colors of the predetermined number of regions of image divided at dividing step, whether or not an object image exists in the vicinity of a center of the image picked up by the image pick-up device, wherein the object image is used as a reference to adjust white balance, and setting step of adjusting gain values of color components included in each of the predetermined number of regions of image, thereby setting white balance of the image corresponding to the image pick-up range of the image pick-up device, when it is determined at judging step that the object image exists in the vicinity of the center of the image picked up by the image pick-up device.

According to still another aspect of the invention, there is provided a computer readable recording medium to be mounted on an apparatus, wherein the apparatus is provided with a computer and image pick-up device having an image pick-up range for picking up an image, the recording medium storing a computer program, when executed, to make the computer perform means, which comprises dividing means for dividing a central area of the image picked up by the image pick-up device into a predetermined number of regions of image, wherein the image corresponds to the image pick-up range of the image pick-up device, judging means for judging based on a variance of colors of the predetermined number of regions of image divided by the dividing means, whether or not an object image exists in the vicinity of a center of the image picked up by the image pick-up device, wherein the object image is used as a reference to adjust white balance, and setting means for adjusting gain values of color components included in each of the predetermined number of regions of image, thereby setting white balance of the image corresponding to the image pick-up range of the image pick-up device, when the judging means determines that the object image exists in the vicinity of the center of the image picked up by the image pick-up device.

DETAILED DESCRIPTION OF THE PREFERRED EMBODIMENTS

Now, an image pick-up apparatus, in which one embodiment of the invention is applied, will be described with reference to the accompanying drawings in detail.

Figure 1:
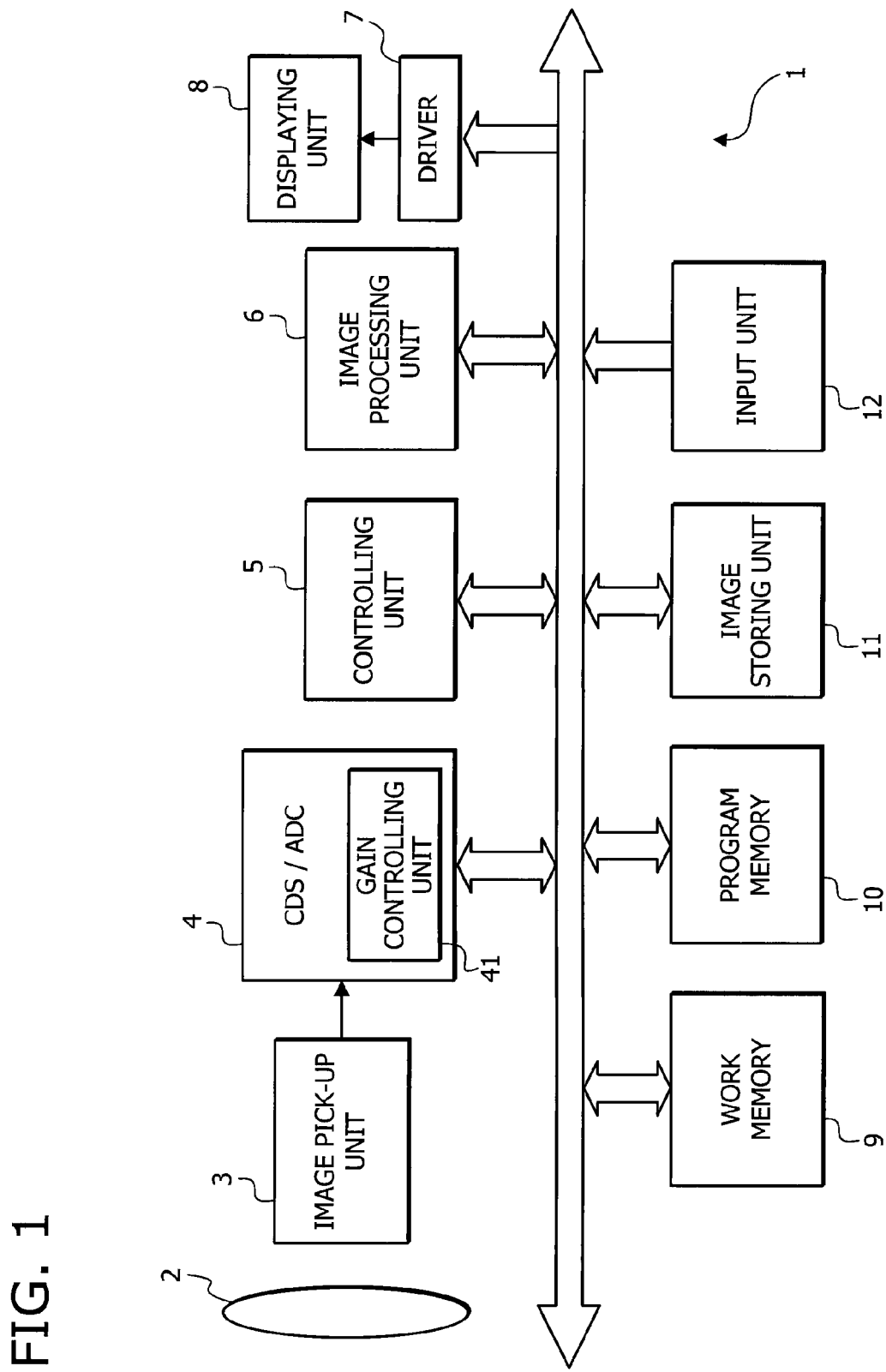
FIG. 1 is a block diagram showing a configuration of the image pick-up apparatus 1 according to an embodiment of the present invention.

FIG. 1 is a block diagram showing a configuration of the image pick-up apparatus 1 according to the embodiment of the invention. As shown in FIG. 1, the image pick-up apparatus 1 is provided with a lens unit 2, image pick-up unit 3, CDS/ADC 4, controlling unit 5, image processing unit 6, driver 7, displaying unit 8, work memory 9, program memory 10, image storing unit 11, and input unit 12.

The lens unit 2 comprises a zoom lens group and a focus lens group, which are moved to their positions by a lens motor (not shown). The image pick-up unit 3 has an image pick-up device such as CCD (Charge Coupled Device) and/or CMOS (Complementary Metal Oxide Semiconductor) image sensor. An image signal output from the image pick-up unit 3 contains RGB components. The image signal is converted into image data containing YUV information (luminance signal and color difference signals) by CDS/ADC 4. In CDS/ADC 4, RGB components are amplified based on respective color gain-values supplied from a gain controlling unit 41. In other words, image data, white balance of which is adjusted by the gain controlling unit 41 is output from CDS/ADC 4.

The controlling unit 5 includes a programmable processor. The controlling unit 5 controls whole operation of the image pick-up apparatus 1. Receiving the image data from CDS/ADC 4, the image pick-up apparatus 1 drives and controls the driver 7 to convert a format of the image data to be displayed on the displaying unit 8 and to display a through image on the displaying unit 8. When recording the image data, the controlling unit 5 supplies the image data to the image processing unit 6. The image processing unit 6 performs various image processing and compression on the image data to create a file of the image data. The file of image data is stored in the image storing unit 11. The work memory 9 is used to temporarily store picked-up or shot image data. The program memory 10 is used to store a computer program run by the controlling unit 5 and various setting values.

The image processing unit 6 stores the file of image data in accordance with an instruction sent from the controlling unit 6.

The input unit 12 comprises various operation keys and switches including as a shutter button, an upper/lower and right/left cursor key. The displaying unit 8 has a display device such as a liquid crystal display device. The controlling unit 5 displays on the displaying unit 8 various messages and a through image or a reduced image of an image shot by the image pick-up unit 3. For example, the though image is of 320 pixels by 240 pixels (QVGA). A user executes various operations including a pressing operation of the shutter button, while watching the through image on the display device.

Figure 2:
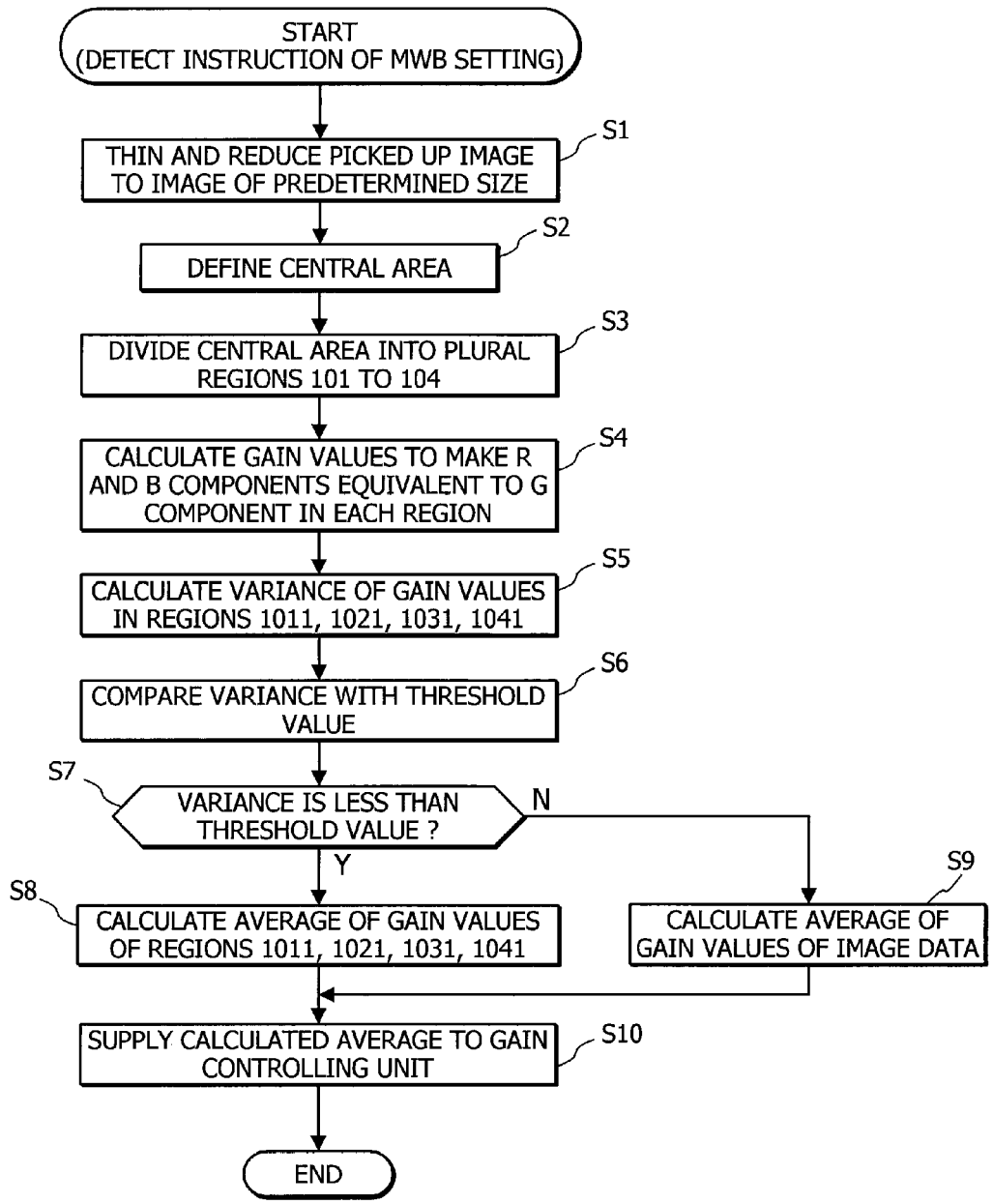
FIG. 2 is a flow chart of operation performed in the present embodiment of the invention.
Figure 3A:
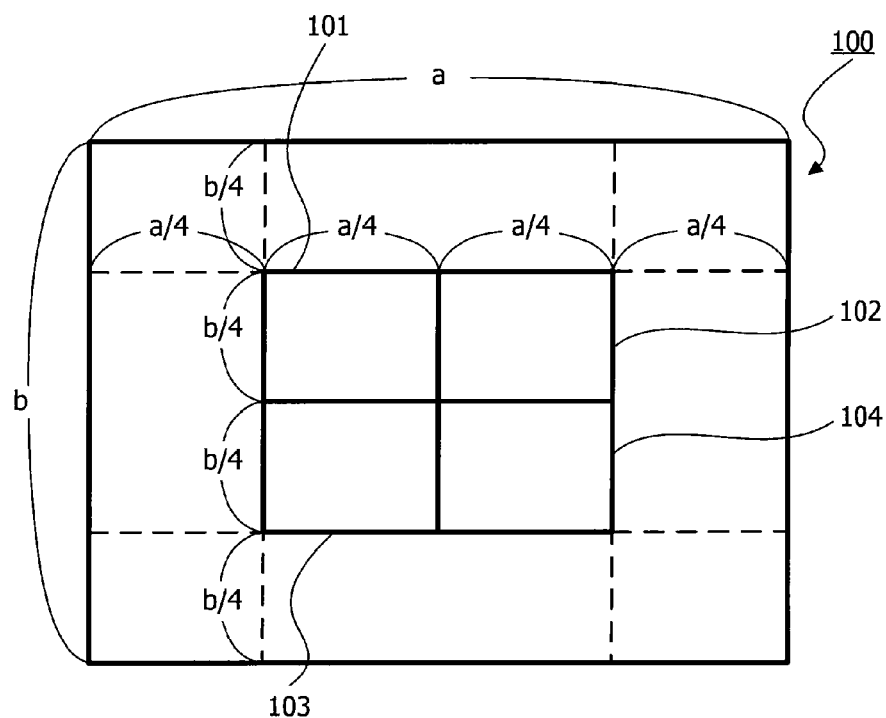
FIG. 3A is a view showing a central area divided into plural regions at step S3 in the flow chart of FIG. 2.

Specific operation performed in the present embodiment will be described with reference to FIG. 2, FIG. 3A and FIG. 3B. FIG. 2 is a flowchart of operation performed in the present embodiment.

The user turns on the power of the image pick-up apparatus 1 and operates to give an instruction of a manual setting of white balance (MWB setting). Detecting MWB setting instruction, the controlling unit 5 makes the image pick-up unit 3 execute an image processing to output image data corresponding to a shooting range, and thins out pixels from the image data output from the image pick-up unit 3, thereby generating reduced-size image data at step S1.

The controlling unit 5 defines a central area of the reduced-size image data at step S2, and further sectionalizes the central area to set plural divided regions at step S3. FIG. 3A is a view showing the central area defined in the reduced-size image data at step S2. The central area is divided into plural divided regions at step S3. As shown in FIG. 3A, the thinned image data 100 has a size of a width "a" (pixels) by a length "b" (pixels). The thinned image data 100 is evenly divided by four both in the horizontal and vertical direction into sixteen divided regions, and the central area defined at step S2 consists of four divided regions 101, 102, 103 and 104 provided at the central portion of the image data 100 as shown in FIG. 3A.

Then, out of the image signal supplied from the image pick-up unit 3, the controlling unit 5 extracts RGB components of image signals corresponding respectively to the divided regions 101 to 104, and obtains gain values of R component and B component so that R component and B component will be made equivalent to G component in each of the divided regions 101 to 104 (step S4).

Figure 3B:
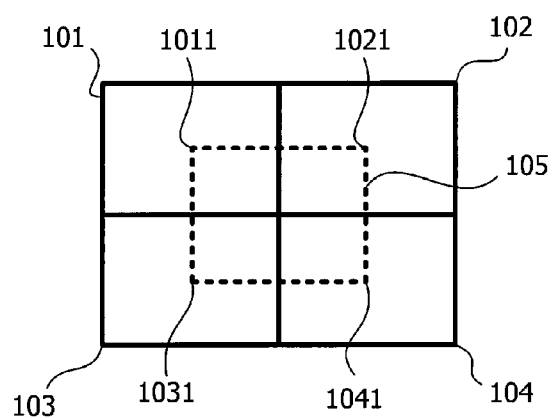
FIG. 3B is a view showing the central area, which is divided into plural regions, a central portion of these plural regions being further divided into plural regions.

Once the gain values of R component and B component in each of the divided regions 101 to 104 have been obtained at step S4, regions 1011, 1021, 1031 and 1041 are defined in the central portion of the divided regions 101 to 104 as shown in FIG. 3B, and the image data 100 corresponding to the regions 1011, 1021, 1031 and 1041 is specified. Then, a variance of colors (gain values) of the image data corresponding respectively to the regions 1011, 1021, 1031 and 1041 is calculated at step S5. The controlling unit 5 compares the calculated variance with a preset threshold value at step S6, thereby judging at step S7 whether or not the variance is equal to or less than the threshold value. When it is determined at step S7 that the variance is equal to or less than the threshold value (YES at step S7), on the assumption that the user selects an object (color pattern) to use as a reference of a white-gray level and takes a picture with the object set at the center of the viewing angle, obtaining image data, gain values of the image data corresponding respectively to the regions 1011, 1021, 1031 and 1041 are calculated, and further an average of the calculated gain values is calculated at step S8. The controlling unit 5 supplies the gain controlling unit 41 with the calculated average as a gain value to be applied to the image signal at step S10. Then, the present operation finishes.

Meanwhile, when it is determined at step S7 that the variance is not equal to or less than the threshold value (NO at step S7), on the assumption that the user takes a picture with no object (color pattern) set at the center of the viewing angle, an average of gain values of the thinned image data 100 is calculated at step S9. The controlling unit 5 supplies the gain controlling unit 41 with the calculated average as a gain value to be applied to the image signal at step S10. Then, the present operation finishes.

In the present embodiment of the invention, the central area of the shooting range is divided into the predetermined number of regions. Depending on the variance of colors of image data corresponding respectively to the plural ranges, it is judged whether white balance is set with an object (color pattern) set in the vicinity of the center of the shooting range or not. Therefore, even if the user has much knowledge about digital cameras or not, he or she can set appropriate white balance of images in a simple manner.

While the present invention applied to the image pick-up apparatus has been described in the above description, it is intended that the invention will not be limited by any of the details of the description herein but can be applied to any electronic apparatus having an image pick-up device and a computer program for controlling such electronic apparatus. It is to be understood that modification and/or alteration to the embodiments described herein, required due to necessity in design and/or other factor, and another combination in the embodiments fall within the scope of the invention defined by the appended claims and/or the scope of the invention corresponding to the specific embodiments.

What is claimed is:

1. An image pick-up apparatus, comprising:
   an image pick-up unit;
   a dividing unit which divides a central area of an image pick-up range of the image pick-up unit into a predetermined number of regions;
   a judging unit which judges, based on a variance of colors of an image picked up by the image pick-up unit corresponding respectively to the regions divided by the dividing unit, whether or not an object image for adjusting white balance exists in a vicinity of a center of the image pick-up range; and
   a first setting unit which adjusts gain values of color components only in each of the predetermined number of divided regions, and sets white balance of the image pick-up range according to the adjusted gain values, when the judging unit judges that the object image exists.

2. The image pick-up apparatus according to claim 1, further comprising:
   a second setting unit which adjusts gain values of color components in a whole image pick-up range, and sets white balance of the image pick-up range according to the adjusted gain values, when the judging unit judges that the object image does not exist.

3. The image pick-up apparatus according to claim 1, wherein the adjustment of the gain values corresponds to calculating an average of gain values of a red component and a blue component out of color components in each of the predetermined number of regions of the central area when the judging unit judges that the object image exists in the central area, and calculating an average of gain values of the red component and the blue component out of color components in a whole image pick-up range when the judging unit judges that the object image does not exist.

4. The image pick-up apparatus according to claim 2, wherein the adjustment of the gain values corresponds to calculating an average of gain values of a red component and a blue component out of color components in each of the predetermined number of regions of the central area when the judging unit judges that the object image exists in the central area, and calculating an average of gain values of the red component and the blue component out of color components in the whole image pick-up range when the judging unit judges that the object image does not exist.

5. The image pick-up apparatus according to claim 1, further comprising:
   a reducing unit which thins and reduces a viewing angle of the image picked up by the image pick-up unit into a predetermined size,
   wherein the image pick-up range corresponds to a range that is thinned and reduced by the reducing unit.

6. The image pick-up apparatus according to claim 2, further comprising:
   a reducing unit which thins and reduces a viewing angle of the image picked up by the image pick-up unit into a predetermined size,
   wherein the image pick-up range corresponds to a range that is thinned and reduced by the reducing unit.

7. The image pick-up apparatus according to claim 3, further comprising:
   a reducing unit which thins and reduces a viewing angle of the image picked up by the image pick-up unit into a predetermined size,
   wherein the image pick-up range corresponds to a range that is thinned and reduced by the reducing unit.

8. The image pick-up apparatus according to claim 4, further comprising:
   a reducing unit which thins and reduces a viewing angle of the image picked up by the image pick-up unit into a predetermined size,
   wherein the image pick-up range corresponds to a range that is thinned and reduced by the reducing unit.

9. A method of setting white balance, comprising:
   dividing a central area of an image pick-up range of an image pick-up unit into a predetermined number of regions;
   judging, based on a variance of colors of an image picked up by the image pick-up unit corresponding respectively to the divided regions, whether or not an object image for adjusting white balance exists in a vicinity of a center of the image pick-up range; and
   adjusting gain values of color components only in each of the predetermined number of divided regions, and setting white balance of the image pick-up range according to the adjusted gain values, when it is judged that the object image exists.

10. A non-transitory computer readable recording medium storing a program that is executable by a computer of an electronic apparatus including an image pick-up unit to control the electronic apparatus to perform functions comprising:
    dividing a central area of an image pick-up range of the image pick-up unit into a predetermined number of regions;
    judging, based on a variance of colors of an image picked up by the image pick-up unit corresponding respectively to the regions divided by the dividing unit, whether or not an object image for adjusting white balance exists in a vicinity of a center of the image pick-up range; and
    adjusting gain values of color components only in each of the predetermined number of divided regions, and setting white balance of the image pick-up range according to the adjusted gain values, when the judging unit judges that the object image exists.

* * * * *